(12) United States Patent
Hein et al.

(10) Patent No.: US 10,151,005 B2
(45) Date of Patent: *Dec. 11, 2018

(54) HIDE SORTING SYSTEMS AND METHODS

(71) Applicant: National Beef Packing Company, LLC, Kansas City, MO (US)

(72) Inventors: Robert Horst Hein, Kansas City, MO (US); Kenneth Graham Press, Kansas City, MO (US)

(73) Assignee: National Beef Packing Company, LLC, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/390,704

(22) Filed: Dec. 26, 2016

(65) Prior Publication Data

US 2017/0107587 A1 Apr. 20, 2017

Related U.S. Application Data

(63) Continuation of application No. 14/724,547, filed on May 28, 2015, now Pat. No. 9,530,162.
(Continued)

(51) Int. Cl.
| | |
|---|---|
| *G06Q 30/06* | (2012.01) |
| *B07C 5/34* | (2006.01) |
| *B07C 5/16* | (2006.01) |
| *C14B 17/00* | (2006.01) |
| *C14C 1/06* | (2006.01) |
| *B07C 5/38* | (2006.01) |
| *G05B 19/418* | (2006.01) |

(Continued)

(52) U.S. Cl.
CPC .............. *C14B 17/005* (2013.01); *B07C 5/16* (2013.01); *B07C 5/34* (2013.01); *B07C 5/38* (2013.01); *B65G 57/00* (2013.01); *B65G 57/02* (2013.01); *C14B 1/14* (2013.01); *C14C 1/06* (2013.01); *C14C 3/00* (2013.01); *C14C 3/06* (2013.01); *C14C 15/00* (2013.01); *G05B 19/4189* (2013.01); *G06Q 30/0621* (2013.01); *G05B 2219/39106* (2013.01)

(58) Field of Classification Search
CPC ........... B07C 5/00; B07C 5/34; B07C 5/3412; B07C 5/38; B65D 79/02
USPC .................................................. 209/552, 583
See application file for complete search history.

(56) References Cited

U.S. PATENT DOCUMENTS

| | | | | |
|---|---|---|---|---|
| 4,199,255 | A * | 4/1980 | Wilson ...................... | C14B 1/00 356/237.1 |
| 5,149,295 | A * | 9/1992 | Bowling .................. | A22B 5/08 452/71 |

(Continued)

*Primary Examiner* — Terrell H Matthews
(74) *Attorney, Agent, or Firm* — Seth Black; Dodd Call Black, PLLC

(57) ABSTRACT

Methods and systems for sorting hides are provided. In particular, one or more embodiments comprise a tanning control system that enhances the traceability of hides by capturing and utilizing data related to the unloading, tanning, sorting, and packaging of hides. Furthermore, one or more embodiments enable the tanning control system to improve efficiency by sorting hides based, at least in part, on data generated during prior tanning processes. Additionally, one or more embodiments facilitate the tanning control system in customizing the sorting and packaging of hides based, at least in part, on one or more hide characteristics and/or customer specifications.

20 Claims, 9 Drawing Sheets

Related U.S. Application Data

(60) Provisional application No. 62/003,998, filed on May 28, 2014.

(51) Int. Cl.
*B65G 57/02* (2006.01)
*C14B 1/14* (2006.01)
*C14C 3/06* (2006.01)
*C14C 15/00* (2006.01)
*B65G 57/00* (2006.01)
*C14C 3/00* (2006.01)

(56) References Cited

U.S. PATENT DOCUMENTS

| | | | | |
|---|---|---|---|---|
| 7,303,081 B2* | 12/2007 | Mallett | ............... | B07C 7/005 |
| | | | | 209/583 |
| 7,389,922 B2* | 6/2008 | Yoshimura | ............ | G06Q 10/087 |
| | | | | 235/382 |
| 8,091,390 B2* | 1/2012 | Houtz | ................ | C14B 1/28 |
| | | | | 69/33 |
| 8,150,633 B2* | 4/2012 | Burke | ................ | A22C 29/005 |
| | | | | 324/668 |
| 9,530,162 B2* | 12/2016 | Hein | ................ | G06Q 30/0621 |
| 2004/0133484 A1* | 7/2004 | Kreiner | ............... | B07C 5/3412 |
| | | | | 705/28 |

* cited by examiner

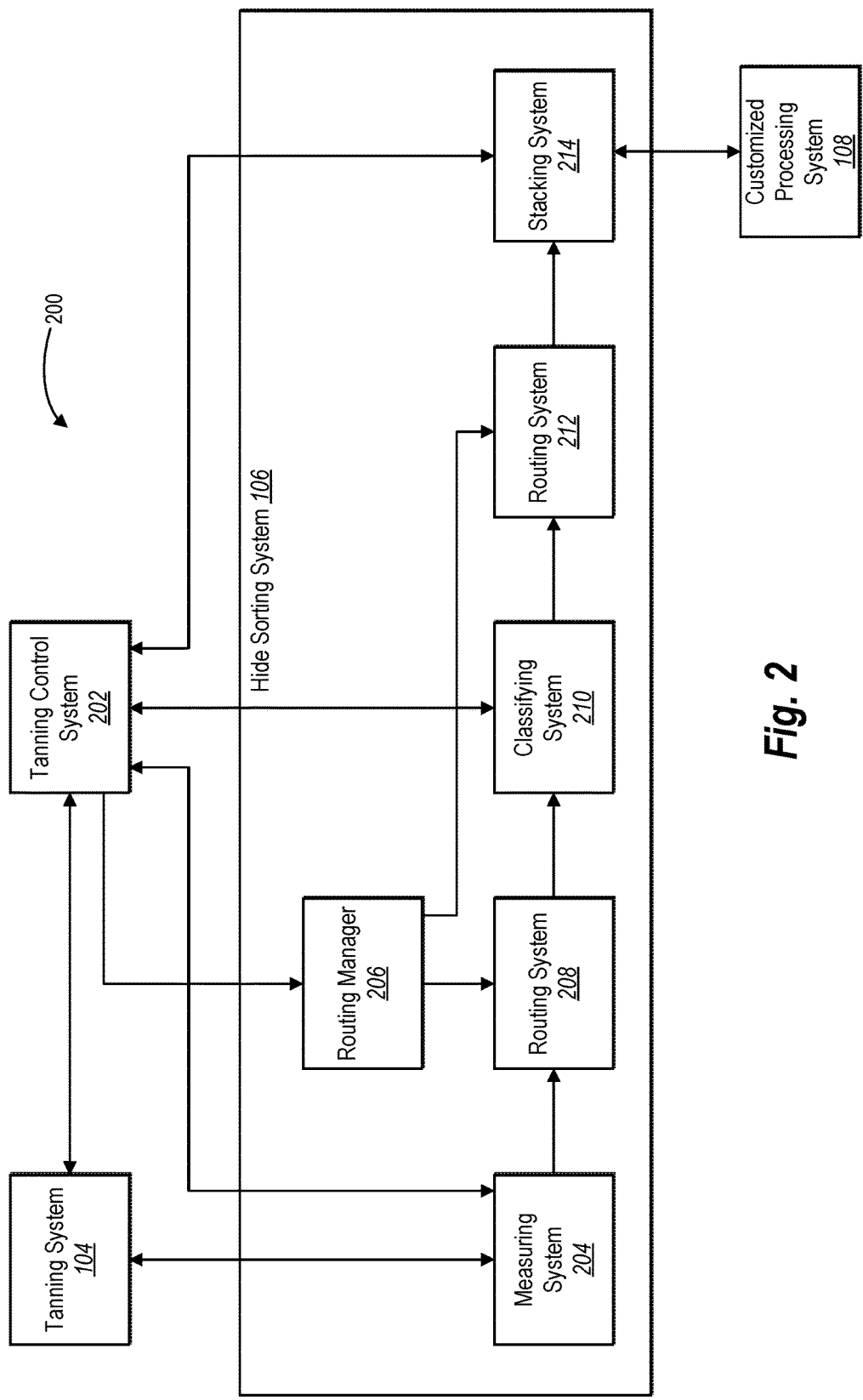

| Batch ID _402_ | Hide Type _404_ | Hide ID _406_ | Hide Characteristic _408_ | Hide Classification _410_ | Stack ID _412_ | Pallet ID _414_ |
|---|---|---|---|---|---|---|
| 100011 | Jumbo | H1505000001 | 30 kg | AA | 01 | P15050001 |
| 100011 | Jumbo | H1505000002 | 30 kg | AA | 01 | P15050001 |
| 100011 | Jumbo | H1505000003 | 30 kg | AS | 02 | P15050002 |
| 100011 | Jumbo | H1505000004 | 30 kg | B | 03 | P15050003 |
| 100011 | Jumbo | H1505000005 | 30 kg | C | 04 | P15050004 |
| 100012 | Heifer | H1505000006 | 20 kg | AA | 05 | P15050005 |
| 100013 | Steer | H1505000007 | 24 kg | REJECT | REJECT | REJECT |

*Fig. 4*

| Batch ID | Batch Weight (TONS) | Batch Hide Count | Batch Hide Type | Liming Drum ID | Chroming Drum ID | Container IDs | Transport Vehicle ID | Plant ID |
|---|---|---|---|---|---|---|---|---|
| 100011 | 8.00 | 285 | Jumbo | 6 | 14 | 1-12 | 1NKWGGGG80J066189 | Liberal |
| 100012 | 7.27 | 260 | Jumbo | 10 | 18 | 13-23 | 1NKWGGGG80J066189 | Liberal |
| 100013 | 7.8 | 355 | Heifer | 7 | 10 | 51-57 | 1XKTDR9X0XJ793590 | Brawley |
| 100014 | 7.5 | 280 | Steer | 19 | 1 | 1-8 | 3NKMHD7X0WF756859 | Dodge |

*Fig. 5*

HIDE SORTING SYSTEMS AND METHODS

CROSS REFERENCE TO RELATED APPLICATIONS

This application is a continuation of U.S. application Ser. No. 14/724,547 filed May 28, 2015 which claims priority to and the benefit of U.S. Provisional Application No. 62/003,998 filed May 28, 2014. This application is related to U.S. application Ser. No. 14/714,006 filed May 15, 2015. The entire contents of the foregoing applications are hereby incorporated by reference in their entirety.

BACKGROUND

1. Technical Field

One or more embodiments relate generally to processing hides. More specifically, one or more embodiments relate to systems and methods of sorting hides.

2. Background and Relevant Art

In general, tanning is the process of transforming raw animal hides into leather hides. Typically, tanning is performed at a tanning facility that receives raw animal hides from slaughterhouses or other facilities that skin animals. Upon receiving the raw animal hides, the tanning facility usually subjects the hides to various tanning processes. For example, most often the tanning facility uses a mechanical and chemical tanning process, such as chrome tanning or vegetable tanning, to convert the raw animal hides into leather hides. Once transformed into leather, the tanning facility may subject the leather hides to further processing, such as wringing, grading, splitting, and shaving, before providing the hides to customers that generate finished leather products from the hides. However, while conventional tanning processes are useful in making leather hides, such processes suffer from several disadvantages.

One disadvantage of conventional tanning processes is a lack of traceability of information relating to the various activities performed within the tanning facility. Conventional tanning processes often fail to record information related to such activities. For example, conventional tanning processes lack the ability to record process information for a particular hide or a particular batch of hides (e.g., the identification of particular machinery used in the tanning process and/or the identification of a chemical recipe used). Moreover, most conventional tanning processes cannot identify and track a batch of hides, an individual hide, and/or a package of hides with which to associate process information. Thus, by failing to record process information, conventional tanning processes do not facilitate traceability of hides throughout the various tanning facility activities. As a result, process malfunctions that result in poor quality hides are often difficult to troubleshoot due to the lack of traceability, and therefore, conventional tanning processes often produce inconsistent hides, which can lead to customer dissatisfaction, lost profit, and increased processing expense.

Another disadvantage is that conventional tanning processes typically package leather hides without regard to information generated during the tanning process. Oftentimes, conventional tanning processes package leather hides based only on information gathered during the packaging process (e.g., an assigned grade of a hide). Accordingly, conventional packaging processes typically fail to utilize prior hide measurements, batch characteristics, or other information that may be available or determined during the various states of the tanning process. Consequently, conventional tanning processes are inefficient as they frequently involve manual sorting and/or packaging of leather hides based on incomplete information about the hides.

Yet another disadvantage is that conventional tanning processes typically package leather hides using a single packaging process, regardless of the characteristics of each particular hide. For example, the packaging process usually involves folding each individual leather hide in the same way. Thus, most conventional tanning processes do not have the ability to customize the packaging process according to customer specifications. Furthermore, conventional packaging processes often involve using manual labor to consistently sort, fold, and package the leather hides according to a single standard. Consequently, in many cases, conventional tanning processes are inflexible, slow, and expensive.

Accordingly, there are a number of considerations to be made in sorting, folding, stacking, and packaging hides.

SUMMARY

Embodiments disclosed herein provide benefits and/or solve one or more of the foregoing or other problems in the art with systems and methods for improving the processing of hides. More specifically, one or more embodiments improve the sorting of hides. In addition, one or more embodiments provide systems and methods that enhance the traceability of hides throughout the packaging process, and thereby increase the efficiency of sorting hides into packages to improve the flexibility, speed, and cost associated with sorting and packaging hides.

For example, one or more embodiments provide systems and methods that record information related to the various activities performed within a tanning facility. More specifically, the systems and methods disclosed herein can provide a tanning control system that stores identifications of particular machinery used to unload, chemically tan, and package hides. Further, in one or more embodiments, a tanning control system can generate and assign unique identifiers to batches of hides, individual hides, and packages of hides. Accordingly, in one or more embodiments, a tanning control system can associate the identifications of particular machinery with the unique identifiers of hides to provide enhanced traceability of hides throughout the various tanning processes. Thus, the systems and methods described herein can assist in improving the consistency of hides, thereby promoting greater customer satisfaction.

Additional example embodiments can provide systems and methods that package hides based, at least in part, on information generated during prior tanning processes. In particular, the systems and methods disclosed herein can provide a tanning control system that utilizes information from the unloading or chemical tanning processes to sort hides into packages. More specifically, in one or more embodiments, a tanning control system can sort hides based on unique batch identifiers generated and associated with the hides prior to the chemical tanning process. Furthermore, in one or more embodiments, a tanning control system can use prior hide measurements, batch characteristics, or other information from prior tanning processes to determine the manner in which to sort, fold, stack, and package hides. Accordingly, example systems and methods described herein can increase the efficiency of sorting and packaging hides by leveraging information obtained from prior tanning processes that is associated with a batch of hides or with an individual hide.

As a further example, one or more embodiments provide systems and methods that sort and package hides based on one or more characteristics associated with a particular hide.

More specifically, the systems and methods disclosed herein can provide a hide sorting system that sorts, folds, stacks, and packages hides according to multiple customer specifications. For instance, in one or more embodiments, a hide sorting system can sort, fold, stack, and package a first type of hide according to a first customer specification and a second type of hide according to a second customer specification. Furthermore, in one or more embodiments, a hide sorting system can automate the packaging of hides by performing the sorting, folding, and stacking without the need for manual labor to handle the hides. Accordingly, one or more embodiments can improve the flexibility, speed, and cost of sorting and packaging hides, thereby providing added value to customers.

Additional features and advantages of exemplary embodiments will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description, or may be learned by the practice of such exemplary embodiments as set forth hereinafter.

BRIEF DESCRIPTION OF THE DRAWINGS

In order to describe the manner in which the above recited and other advantages and features can be obtained, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. In the following drawings, bracketed text and blocks with dashed borders (e.g., large dashes, small dashes, dot-dashes, dots, etc.) may be used to illustrate optional features or operations that add additional features to one or more embodiments. Such notation, however, should not be taken to mean that these are the only options or optional operations, and/or that blocks with solid borders are not optional in certain embodiments. Understanding that these drawings depict only typical embodiments and are not therefore to be considered to be limiting, such embodiments will be described and explained with additional specificity and detail through the use of the accompanying drawings in which:

FIG. 2 illustrates a detailed schematic diagram of a hide sorting system of FIG. 1 in accordance with one or more embodiments;

FIG. 4 illustrates exemplary portions of a tanning system database in accordance with one or more embodiments;

FIG. 5 illustrates additional exemplary portions of a tanning system database in accordance with one or more embodiments;

DETAILED DESCRIPTION

Figure 1:
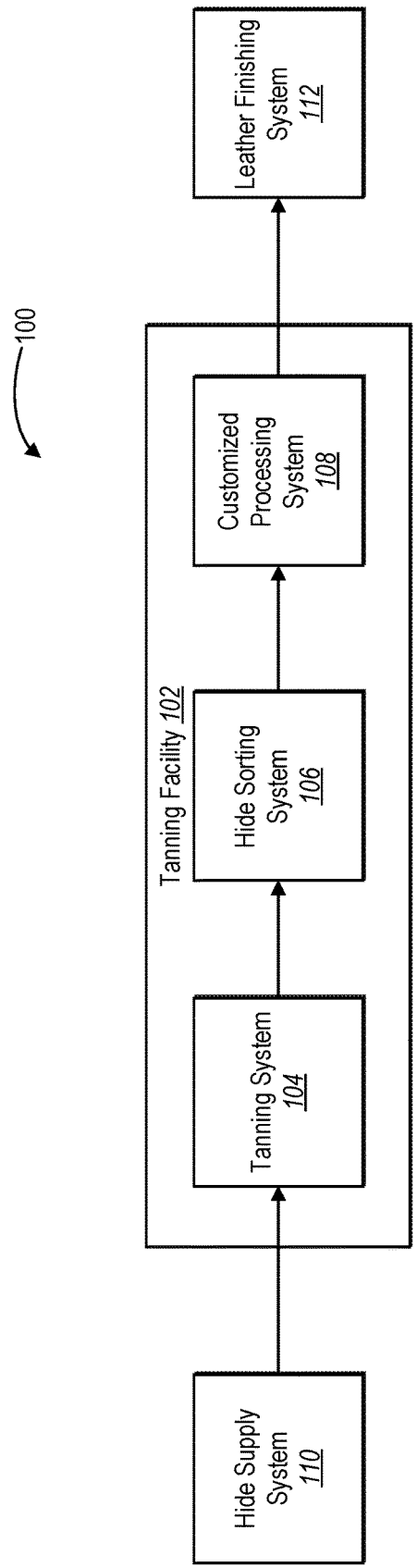
FIG. 1 illustrates a schematic diagram of a system for processing raw animal hides into leather in accordance with one or more embodiments.

One or more embodiments include a tanning control system that enhances the traceability of hides throughout the packaging process. For example, a tanning control system can control various systems in a manner that enhances traceability, on an individual hide level, by capturing information related to one or more processes of a hide sorting system. For instance, a tanning control system can generate a unique hide identifier for each hide and associate the hide identifier with data corresponding to one or more processes of a hide sorting system (e.g., unique identifiers for a particular sammying machine, weight scale, conveyor systems, grading machine, folding device, and pallet used to package the hide). Thus, by capturing and tracking information related to the activities performed in a tanning facility, example embodiments of a tanning control system can facilitate troubleshooting defects and other problems associated with processing hides, and thereby provide improved consistency in producing hides.

Furthermore, one or more embodiments of a tanning control system can facilitate the packaging of hides based, at least in part, on information generated from processes that occur prior to hides arriving at a hide sorting system. In particular, in one or more embodiments a tanning control system can cause a hide sorting system to sort a hide based, at least in part, on a batch identifier that the tanning control system generates during a process of unloading and/or chemically tanning the hide. More specifically, for example, a tanning control system can sort a hide based on batch characteristics (e.g., a batch hide type) associated with a batch identifier of the hide. Furthermore, in one or more embodiments a tanning control system can sort a hide based on any combination of a batch identifier associated with the hide, one or more measurements of the hide obtained by a measuring system of a hide sorting system, or a grade of the hide obtained by a classifying system of a hide sorting system. Accordingly, one or more embodiments improve the efficiency of sorting and packaging hides by utilizing relevant information generated from prior activities performed during a tanning process, as well as information obtained during a packaging process (e.g., at a hide sorting system).

In addition, one or more embodiments include a tanning control system that packages hides based on one or more characteristics of each hide and one or more customer specifications. More specifically, for instance, a tanning control system can determine one or more characteristics of a hide and, based on those characteristics, the tanning control system can identify a particular customer specification to use to sort, fold, stack, and package the hide. For example, a customer specification can include a sorting specification (i.e. an indication of acceptable hide characteristics, as requested by the customer), a folding specification (i.e. an indication of how to fold the hides, as requested by the customer), a stacking specification (i.e. an indication of how to stack the hides, as requested by the customer), and a packaging specification (i.e. an indication of how to package the hides, as requested by the customer). Thus, in one or more embodiments, a tanning control system can sort, fold, stack, and package a first type of hide according to a first customer specification and a second type of hide according to a second customer specification. Moreover, one or more embodiments can automate the packaging of hides according to customer specifications without the use of human intervention. Thus, one or more embodiments improve the flexibility of packaging hides and also reduce the time and cost needed to package hides in accordance with multiple different customer specifications.

For example, FIG. 1 is a schematic diagram illustrating a tannery system 100 (or simply "system 100") for processing raw animal hides into leather in accordance with some embodiments. An overview of system 100 will be described next in relation to FIG. 1. Thereafter, a more detailed description of the components and processes of system 100 will be described in relation to the remaining figures.

As illustrated by FIG. 1, the system 100 can include a tanning facility 102. As illustrated in FIG. 1, tanning facility 102 can include a tanning system 104, a hide sorting system 106, and/or a customized processing system 108. Moreover, as FIG. 1 illustrates, the system 100 can include a hide supply system 110 and/or a leather finishing system 112. As explained in greater detail below, each component 104-108 of the tanning facility 102, as well as components 110 and 112, can be managed and/or controlled by one or more computing devices.

In general, and as FIG. 1 illustrates, system 100 can include a hide supply system 110 that provides raw animal hides obtained from the slaughter of certain animals. For example, the hide supply system 110 provides raw animal hides to tanning system 104 of tanning facility 102. Tanning system 104 employs various tanning systems, processes, machinery, and apparatuses to transform the raw animal hides into leather. After the tanning system 104 transforms the hides into leather, a hide sorting system 106 then sorts and stacks the hides. After the hides are sorted and stacked by hide sorting system 106, a customized processing system 108 can provide further processing (e.g., rewetting, trimming, splitting, folding, etc.) according to additional customized specifications (e.g., a customer order or requirements in a customer specification). Following processing by customized processing system 108, a leather finishing system 112 produces finished leather from the hides.

In one or more embodiments of system 100, hide supply system 110 can be a slaughterhouse. For example, hide supply system 110 can be a slaughterhouse for hooved livestock (e.g., cattle, sheep, pigs, goats, etc.) or a slaughterhouse for exotic animals (e.g., deer, bison, buffalo, ostrich, kangaroo, crocodile, alligator, snake, eel, and stingray). Alternatively, in one or more embodiments of system 100, hide supply system 110 can be a knackery (i.e. a facility where animals are not slaughtered for human consumption). Additionally, in one or more embodiments of system 100, hide supply system 110 can be part of, and physically located within, tanning facility 102.

Regardless of whether hide supply system 110 is a slaughterhouse, knackery, or a system within tanning facility 102, hide supply system 110 produces raw animal hides that can be tanned into leather by tanning facility 102. In one or more embodiments, hide supply system 110 obtains raw animal hides by skinning animals as part of the slaughtering process. Further, in one or more embodiments, hide supply system 110 can perform curing of the raw animal hides either by treating the raw animal hides with salt (e.g., by wet-salting or brine-curing the hides) or preserving the raw animal hides at a cold temperature (e.g., by packing the hides with ice). Moreover, in one or more embodiments, hide supply system 110 can pack the raw animal hides, whether cured or uncured, into transport containers, which are then loaded onto a transport vehicle (e.g., a semi-trailer truck) for delivery to tanning facility 102.

Additionally, in one or more embodiments hide supply system 110 can use one or more computing devices to generate and store hide supplier information to associate with hides that the hide supply system 110 provides. For example, hide supply system 110 can mark or otherwise associate a container of hides with various types of hide supplier information. In one or more embodiments, hide supply system 110 can generate a hide supplier information file to associate with a container of hides, provide access to the hide supplier information file to the tanning facility 102, and tag the transport container (e.g., with a computer readable code, such as a barcode or QR code) so that the tanning facility 102 can access the hide supplier information file upon receiving the container of hides (e.g., scanning the barcode or QR code to access the hide supplier information over a network).

The hide supplier information can include various types of information. For example, the hide supplier information may include a plant identifier (e.g., a slaughterhouse name and/or location), transport vehicle identifiers (e.g., semi-trailer truck vehicle identification numbers or VINs), transport container identifiers (e.g., unique numerical identifiers), and a date of slaughter for the raw animal hides. In addition, the hide supplier information can include information related to hide characteristics, such as hide type, packaged hide weight, pre-packed hide weight, source of hides (e.g., cattle ranch location) and any other hide characteristic. Accordingly, in one or more embodiments, hide supply system 110 can then use one or more computing devices to provide the hide supplier information to tanning facility 102 in order to facilitate greater traceability of hides and enable tanning facility 102 to further refine its tanning processes.

Alternatively or additionally, in one or more embodiments hide supply system 110 can provide hide supplier information in documentation that accompanies the transport vehicle and/or transport containers received by tanning facility 102. For example, in one or more embodiments hide supply system 110 can mark transport containers of raw animal hides with hide supplier information labels which can be read or input into one or more computing devices of tanning facility 102 (e.g., a tanning system database of a tanning control system as discussed in greater detail below). Accordingly, the input of hide supplier information from hide supply system 110 into one or more computing devices of tanning facility 102 enables traceability of hides from their origin. Thus, this level of traceability assists tanning facility 102 in troubleshooting problems or reducing inefficiencies in tanning processes that may be due to issues associated with a particular hide supply system 110.

As further illustrated by FIG. 1, one or more embodiments of system 100 include a tanning system 104 that can receive raw animal hides from hide supply system 110. For example, in one or more embodiments, tanning system 104 can receive raw animal hides in transport containers shipped from hide supply system 110 to tanning facility 102 using a transport vehicle. Further, after receiving raw animal hides, tanning system 104 can transform the raw animal hides into leather. As an example, in one or more embodiments, tanning system 104 uses various systems, processes, machinery, and apparatuses to transform raw animal hides into wet-blue leather hides. As an alternative example, in one or more embodiments, tanning system 104 uses various systems, processes, machinery, and apparatuses to transform raw animal hides into wet-white leather hides.

Moreover, in one or more embodiments, tanning system 104 can generate and store tannery process information related to batches of raw animal hides and associate or incorporate hide supplier information into the tannery process information to provide improved traceability. Also, as discussed in greater detail below, tanning system 104 can use one or more computing devices to manage and control the various systems, processes, machinery, and apparatuses used to convert the raw animal hides into leather.

As FIG. 1 illustrates, one or more embodiments of tanning facility 102 include a hide sorting system 106. More specifically, in one or more embodiments hide sorting system 106 receives hides produced by the tanning processes of tanning system 104. For example, hide sorting system 106 can receive hides that are automatically transported from tanning system 104 to hide sorting system 106 (e.g., via a conveyor system). As an alternative example, hide sorting system 106 can receive hides that are manually transported from tanning system 104 to hide sorting system 106 (e.g., via rolling carts).

Further, in one or more embodiments hide sorting system 106 grades the hides received from tanning system 104. For example, hide sorting system 106 can grade the hides using computer vision and machine learning techniques that assign a grade to each hide. Alternatively, hide sorting system 106 can grade the hides manually using a human operator to inspect each hide and assign a grade to each hide.

The grading system used by hide sorting system 106 can be a national hide grading standard, an international hide grading standard, an industry-wide hide grading standard, or a proprietary hide grading standard. For example, a proprietary hide grading standard can assign an "AA" grade to hides that include a single butt brand, light healed scratches through the prime, isolated light open scratches at the margins, and are suitable for full grain aniline or semi-aniline leather applications; an "AS" grade to hides that include two butt brands or butt and center brands, light healed scratches through the prime, isolated light open scratches at the margins, and are suitable for full grain aniline or semi-aniline leather applications; a "B" grade to hides that include up to two brands, including both butt and rib brands, with medium healed scratches and open scratches through the prime, and are suitable for pigmented or lightly tanned leather applications; and a "C" grade to hides that include multiple brands, minimal open scratches, multiple healed scratches throughout the hides, and are suitable for corrected grain leather applications.

As an alternative example, a proprietary hide grading standard can assign an "A" grade to hides that are free from parasite damage, contain butt brands, have light open and healed scratches throughout the prime, and are suitable for full grain aniline or semi-aniline leather applications; a "B" grade to hides that have healed parasite damage at the margins, butt brands, medium healed and open scratches in the prime, and are suitable for pigmented or lightly tanned leather applications; a "C" grade to hides that have heavy parasite damage, multiple brands, open scratches through the prime, and are suitable for corrected grain leather; and a "Reject" grade to hides that are misshapen, damaged, or have gross processing defects, but nevertheless are suitable for heavily embossed leathers.

In one or more embodiments, hide sorting system 106 sorts, folds, stacks, and packs each hide in response to, at least in part, a grade being assigned to each hide. For example, hide sorting system 106 can include a plurality of stacking sites, such that hides of the same grade can be sorted, folded, stacked, and packed at the same stacking site. Additionally, in one or more embodiments, hide sorting system 106 can perform rewetting, sammying (i.e. wringing), shaving, trimming, and/or splitting of the hides prior to sorting, folding, and stacking each hide at a particular stacking site.

Moreover, in one or more embodiments, the hide sorting system 106 can tag, mark, or otherwise label each hide with a unique hide identifier that can be stored by one or more computing devices of tanning facility 102 for purposes of improved traceability and quality assurance. Furthermore, the hide sorting system 106 can associate the unique hide identifier for each hide with the assigned grade for each hide, as well as other tannery process information that the tanning facility 102 can generate and store using one or more computing devices. In one or more embodiments, the tanning facility 102 can assign a unique hide identifier before a grade is assigned to a particular hide, or alternatively, the hide sorting system 106 can assign a grade to a hide before a unique hide identifier is assigned to a particular hide. Thus, the association of a unique hide identifier to a grade of a hide can occur once the hide sorting system 106 determines both items of information.

As further illustrated by FIG. 1, tanning facility 102 can include a customized processing system 108. In one or more embodiments, customized processing system 108 receives hides that the hide sorting system 106 has previously graded. For example, customized processing system 108 can receive hides that are automatically transported (e.g., via a conveyor system) from hide sorting system 106, or alternatively, customized processing system 108 can receive hides that are manually transported (e.g., via rolling carts) from hide sorting system 106.

Moreover, in one or more embodiments, customized processing system 108 performs further processing on hides. As an example, customized processing system 108 can rewet and/or wring (i.e. sammy) hides to a moisture level according to customer requirements (e.g., as indicated by a customer order or customer specification). As a further example, customized processing system 108 can trim and/or shave the hides to a particular size, split the hides to a specified thickness, and/or fold the hides in a certain manner. Thus, customized processing system 108 can perform one or more processes, including for example, trimming, shaving, splitting, and folding, and the one or more processes can be tailored according to customer requirements (e.g., as indicated by a customer order or customer specification). Furthermore, in one or more embodiments, customized processing system 108 can pack the hides for shipment or storage purposes.

FIG. 1 further illustrates that system 100 can include a leather finishing system 112. In one or more embodiments, leather finishing system 112 receives hides from tanning facility 102 and transforms those hides into finished leather using a variety of processes. For example, leather finishing system 112 can perform any number of leather finishing processes, including retanning, coloring, fatliquoring, setting out, drying, conditioning, staking, dry milling, buffing, finishing, and/or plating. Once leather finishing system 112 converts the hides into finished leather, leather product manufacturers can use the finished leather to make leather products for end consumers.

FIG. 2 illustrates a detailed schematic diagram of a system 200 that, in accordance with one or more embodiments, shows a hide sorting system 106 of a tanning facility 102 of FIG. 1. FIG. 2 further illustrates that in one or more embodiments system 200 includes tanning system 104 and customized processing system 108 of FIG. 1. Moreover, as shown by FIG. 2, the system 200 includes a tanning control system 202. In addition, FIG. 2 shows that hide sorting system 106 includes a measuring system 204, a routing manager 206, a routing system 208, a classifying system 210, a routing system 212, and a stacking system 214.

Furthermore, in one or more embodiments, tanning system 104, hide sorting system 106, and customized processing system 108 can include one or more computing devices, as described herein. Likewise, in one or more embodiments, tanning control system 202, measuring system 204, routing manager 206, routing system 208, classifying system 210, routing system 212, and stacking system 214 can also include one or more computing devices, as described in further detail below.

As shown in FIG. 2, one or more embodiments of the hide sorting system 106 include a measuring system 204 that can measure one or more characteristics of each hide processed by hide sorting system 106. In particular, measuring system 204 can measure one or more characteristics of each hide received from tanning system 104 and provide data representing the one or more measured characteristics to tanning control system 202. Accordingly, tanning control system 202 can determine the sorting of each hide based, at least in part, on one or more characteristics of each hide, as measured and provided by measuring system 204.

Measuring system 204 can measure a variety of hide characteristics that include, but are not limited to, weight, thickness, length, width, surface area, presence of butt brands or scratches, etc. To illustrate, measuring system 204 can include one or more measuring devices communicatively connected to tanning control system 202. For example, measuring system 204 can include a weight scale that determines a weight for each hide received from tanning system 104. In particular, the weight scale can include one or more load cells supporting a conveyor, such that the one or more load cells detect a weight for each hide as the hide passes along the conveyor.

As another example, measuring system 204 can include a conveyor coupled with one or more sensors (e.g., roller sensors) that determine a thickness, length, and/or width for each hide received from tanning system 104. More specifically, one or more sensors can determine a thickness of each hide by detecting an amount that each hide displaces the one or more sensors when moved along the conveyor. Further, one or more sensors can determine a length of each hide by, for example, determining the speed of the conveyor and detecting an amount of time that the one or more sensors are displaced as the hide moves along the conveyor. Additionally or alternatively, measuring system 204 can detect a number of revolutions of roller sensors to determine a length of each hide as the hide passes through the roller sensors. Moreover, measuring system 204 can determine a width for each hide by arranging one or more sensors across a conveyor and detecting which of the one or more sensors come in contact with each hide as they pass through the conveyor. Furthermore, by determining the length and width of each leather hide, measuring system 204 can also then determine the surface area of each hide.

As a further example, measuring system 204 can include a machine vision device (e.g., camera, scanner, photo cell, etc. coupled to a computing device) that determines the length, width, and/or surface area of each hide. In particular, a machine vision device can capture an image of each hide and determine the length, width, and/or surface area based on the captured image. Moreover, a machine vision device can detect the presence of butt brands and/or scratches on each hide by analyzing an image of one or more sides of each hide.

Additionally, in one or more embodiments measuring system 204 can include a marking device that marks each hide with a unique hide identifier. For example, measuring system 204 can generate a unique hide identifier for a hide, direct a marking device to mark the hide with the unique hide identifier, and then communicate the unique hide identifier to tanning control system 202. Alternatively, measuring system 204 can receive a unique hide identifier of a hide generated by tanning control system 202 and, in turn, direct a marking device to mark the hide with the unique hide identifier.

Moreover, measuring system 204 can also include a wringing (i.e. sammying) machine that wrings each hide to a particular moisture level. For example, a wringing machine can wring each hide to a static predetermined moisture level. Alternatively, a wringing machine can wring each hide to a moisture level received from tanning control system 202. More specifically, tanning control system 202 can determine a moisture level based on a batch identifier associated with each hide and/or one or more other characteristics of the hide and provide that moisture level to a wringing machine to ensure each hide has a correct moisture level.

Furthermore, measuring system 204 can include a trimming machine and/or a shaving machine that trims and/or shaves each hide to particular dimensions. For example, a trimming machine can modify the length and/or width of hides (e.g., by removing uneven edges or excess material from each hide). Likewise, a shaving machine can modify the thickness of hides (e.g., by cutting the top and/or bottom surfaces of each hide). The trimming machine and shaving machine can operate according to either predetermined settings or one or more settings specified by tanning control system 202 and provided to measuring system 204 (e.g., based on customer specifications).

Additionally, when measuring system 204 receives one or more hides from tanning system 104, measuring system 204 can provide tanning control system 202 with a batch identifier associated with the one or more hides. For example, a human operator can input into measuring system 204 (e.g., via a user interface of a computing device) a batch identifier associated with one or more hides (e.g., by manually inputting the batch identifier, scanning a barcode on a rolling cart, etc.). In turn, measuring system 204 can provide the batch identifier to tanning control system 202.

Alternatively, tanning control system 202 can determine a batch identifier associated with one or more hides being processed by measuring system 204 (e.g., by identifying a batch identifier associated with the most recently unloaded tanning drum which measuring system 204 has not yet begun processing). Accordingly, by determining a batch identifier associated with the one or more hides that measuring system 204 is processing, tanning control system 202 can then sort the one or more hides based, at least in part, on characteristics associated with the determined batch identifier (e.g., characteristics determined during prior tanning processes).

As FIG. 2 illustrates, once measuring system 204 determines one or more characteristics of a hide and/or a batch identifier associated with the hide, measuring system 204 can communicate that characteristic and/or the batch identifier to tanning control system 202. In response, and as also shown by FIG. 2, tanning control system 202 can communicate with routing manager 206 to direct routing system 208 to transport the hide from measuring system 204 to classifying system 210. Alternatively, in one or more embodiments, routing system 208 can automatically transport the hide from measuring system 204 to classifying system 210, without the need for direction or control signals from routing manager 206.

Thus, in one or more embodiments, routing manager 206 can include a computing device communicatively coupled to tanning control system 202 and routing system 208. In particular, routing manager 206 can include a computing device, such as a programmable logic controller ("PLC"). Further, in one or more embodiments, routing system 208 can include a conveyor system (e.g., a belt conveyor) in communication with routing manager 208.

FIG. 2 further illustrates that one or more embodiments include a classifying system 210 that classifies each hide processed by hide sorting system 106. More specifically, classifying system 210 determines a classification for each hide received from measuring system 204 and then classifying system 210 provides the determined classification to tanning control system 202. Accordingly, tanning control system 202 can direct the sorting of each hide based, at least in part, on the classification that classifying system 210 determines for each hide.

Classifying system 210 can determine and assign various classifications to each hide. In some embodiments, classifying system 210 determines and assigns a hide grade as the classification (e.g., a grade according to a national hide grading standard, international hide grading standard, industry-wide hide grading standard, or a proprietary hide grading standard, as discussed above). In other embodiments, classifying system 210 determines and assigns a category as the classification, wherein the category can distinguish between various hides (e.g., weight category, length category, width category, surface area category, thickness category, shape category, blemish category (scrape/brand), etc.).

Moreover, in one or more embodiments classifying system 210 can include a classifying device. For example, a classifying device can include a conveyor positioned to hold a hide and enable a human operator to view the hide to determine a classification (e.g., a grade) for the hide. Further, once the human operator determines the classification for a hide, the human operator can provide user input to classifying system that specifies the classification (e.g., by providing user input to a computing device of classifying system 210, such as by pressing a button coupled to a PLC). In turn, classifying system 210 can provide an indication of the classification to tanning control system 202. As another example, a classifying device can include a computer vision device (e.g., camera, scanner, photo cell, etc. coupled to a computing device) that determines a classification for a hide by capturing and analyzing an image of the hide. Thus, once the computer vision device determines a classification for a hide, the computer vision device can provide an indication of the classification to tanning control system 202 (e.g., via communication over a network).

As shown by FIG. 2, once classifying system 210 provides a classification of a hide to tanning control system 202, tanning control system 202 can respond by communicating with routing manager 206 to transport the hide from classifying system 210 to a particular stacking site of stacking system 214 via routing system 212. Accordingly, in one or more embodiments, routing system 212 can include a conveyor system (e.g., a belt conveyor) in communication with routing manager 208. Additionally, routing system 212 can include a folding table that facilitates the folding of pliable hides by a folding device, but prevents the pliable hides from falling to the ground and/or folding improperly.

Furthermore, in one or more embodiments stacking system 214 can include a plurality of stacking sites. In particular, each stacking site can include one or more pallets to stack hides on. Also, each stacking site can include a weight scale (e.g., load cells) that detects the weight of hides loaded onto a particular pallet. Thus, stacking system 214 can communicate to tanning control system 202 the load (i.e. weight) on a particular pallet and tanning control system 202 can then use this information in determining how to route hides to particular stacking sites (e.g., by determining whether particular stacking sites are empty, partially full, or full). Additionally, each stacking site of stacking system 214 can include a folding device that folds hides in a specified manner (e.g., as directed by tanning control system 202 according to a folding specification).

Moreover, in one or more embodiments stacking system 214 and/or each stacking site can communicate a stacking site status (e.g., "Empty", "Partially Full", or "Full/Inactive") to tanning control system 202 for use in the hide sorting process. The stacking site status can be based on the weight and/or number of the hides at a particular stacking site. A stacking site with a status of "Empty" can receive any acceptable hide of any characteristics, classification, and associated batch identifier. In contrast, a stacking site with a status of "Partially Full" can receive any hide that is compatible with the characteristics of the hides already stacked at that site. Further, a stacking site with a status of "Full/Inactive" cannot receive any additional hides (i.e. until the full pallet is removed from the stacking site and replaced with an empty pallet using either manual labor or automated machinery). Thus, in one or more embodiments tanning control system 202 can consider the stacking site status of each stacking site when determining how to route a hide from classifying system 210 to a particular stacking site of stacking system 214 via routing system 212.

As already discussed, in one or more embodiments, tanning control system 202 receives indications or measurements of one or more characteristics of a hide from measuring system 204. Tanning control system 202 can also receive, from measuring system 204, a batch identifier associated with a hide or, alternatively, tanning control system 202 can independently determine a batch identifier associated with a hide that measuring system 204 is processing. Further, tanning control system 202 can receive, from classifying system 210, one or more classifications of the hide. Thus, in one or more embodiments tanning control system 202 can determine how to route a hide from classifying system 210 to a particular stacking site of stacking system 214 via routing system 212 (e.g., a conveyor system) based on any combination of one or more characteristics of the hide, the batch identifier associated with the hide, characteristics associated with the batch identifier of the hide, and/or the classification of the hide.

Moreover, as previously mentioned, in one or more embodiments tanning control system 202 generates a unique hide identifier for each hide that hide sorting system 106 processes. To improve the traceability of hide sorting processes, tanning control system 202 can store the unique hide identifier in a tanning system database. Further, upon receiving one or more characteristics of a hide from measuring system 204, tanning control system 202 can associate the one or more characteristics with the unique hide identifier and store the one or more characteristics in the tanning system database. Similarly, upon receiving one or more classifications of a hide from classifying system 210, tanning control system 202 can associate the one or more classifications with the unique hide identifier and store the one or more classifications in the tanning system database. Moreover, upon stacking a hide at a particular stacking site, tanning control system 202 can associate the unique hide identifier with a unique stack identifier of the stacking site and/or a unique pallet identifier of the pallet the hide is on, and such an association can also be stored in the tanning system database. Accordingly, by recording and associating such information, tanning control system 202 enhances the traceability of hides, thereby facilitating the troubleshooting of tanning processes, which in turn can lead to the improvement of those same processes.

In addition, in one or more embodiments tanning control system 202 can identify unique device identifiers for each component or device used to sort and package a particular hide. For example, tanning control system 202 can identify a unique device identifier for each component or device of measuring system 204, routing system 208, classifying system 210, routing system 212, and stacking system 214 used to process a particular hide. Further, tanning control system 202 can associate these unique device identifiers with the unique hide identifier of the particular hide and store this information in a tanning system database. Thus, identifying and storing device identifiers of devices used to process a particular hide facilitates improvements in tanning processes and troubleshooting of those processes.

Figure 3A:
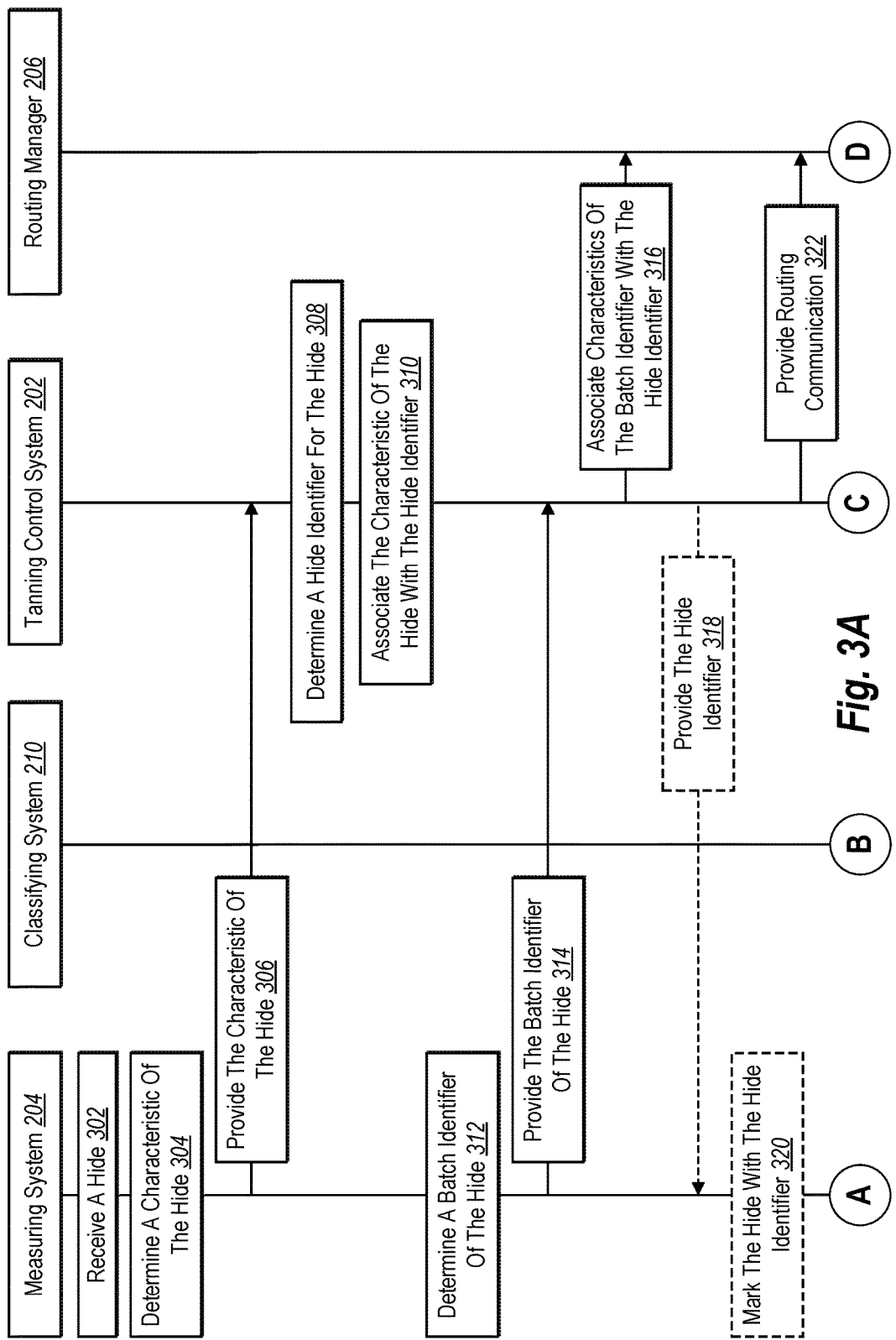
FIGS. 3A-3B illustrate a sequence-flow diagram of interactions between a measuring system, a classifying system, a tanning control system, and a routing manager of FIG. 2 in accordance with one or more embodiments.
Figure 3B:
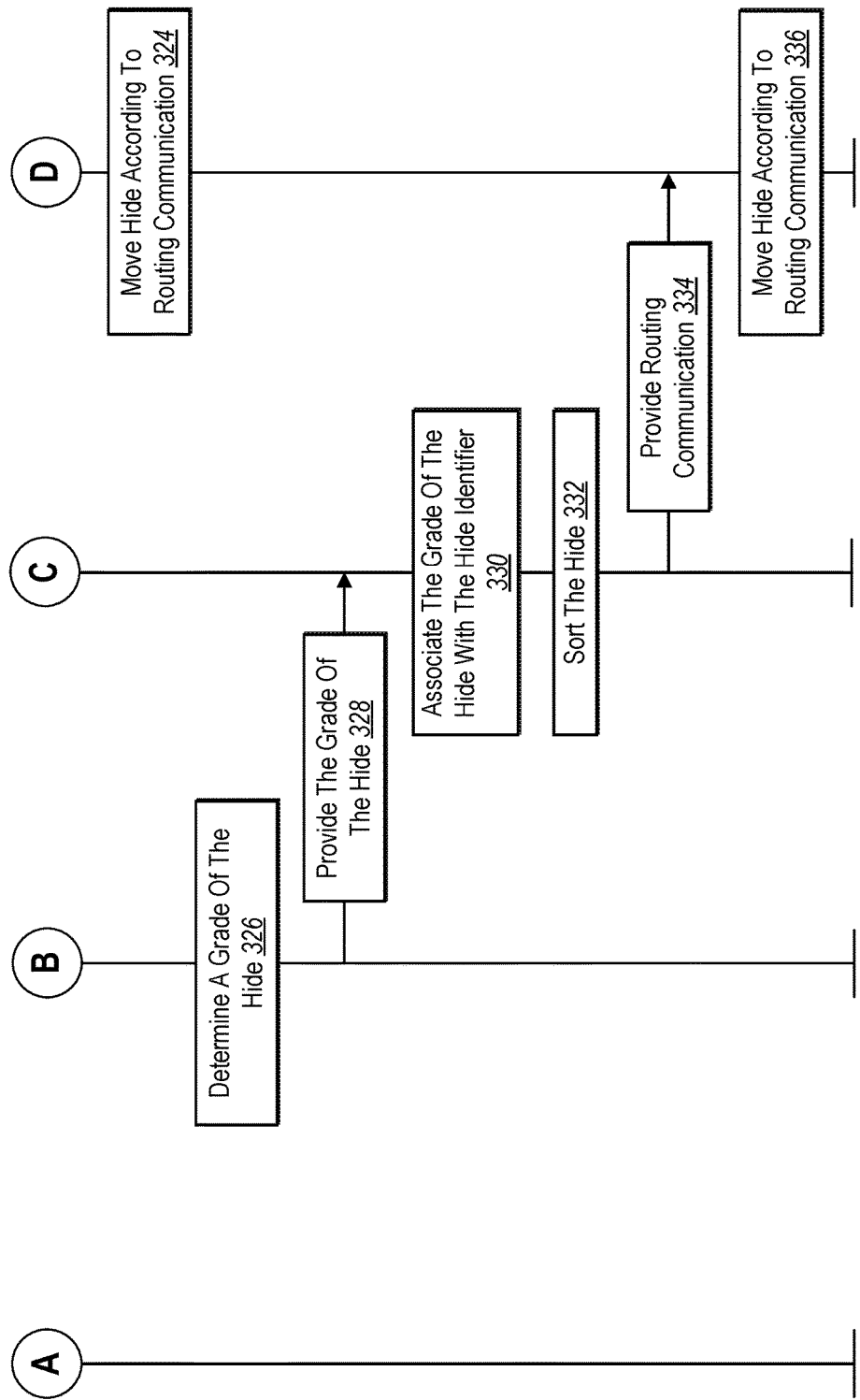

Referring now to FIGS. 3A-3B, which illustrate a sequence-flow diagram of interactions between the measuring system 204, the classifying system 210, the tanning control system 202, and the routing manager 206 of FIG. 2. The sequence-flow diagram of FIGS. 3A-3B illustrates an example process flow of interactions between the measuring system 204, the classifying system 210, the tanning control system 202, and the routing manager 206 of FIG. 2. In particular, FIGS. 3A-3B illustrate that in one or more embodiments the tanning control system 202 controls and/or communicates with measuring system 204, classifying system 210, and routing manager 206 to sort a hide to a particular stacking site (e.g., on a pallet located at a stacking site of stacking system 214).

As FIG. 3A illustrates, step 302 includes receiving a hide. More specifically, measuring system 204 receives a hide from a tanning system (e.g., tanning system 104). For example, measuring system 204 can receive a hide that is manually transported from a tanning drum of a tanning system (e.g., through the use of one or more human operators who manually carry the hide or use a rolling cart). As an alternative example, measuring system 204 can receive a hide that is automatically transported from a tanning drum of a tanning system (e.g., through the use of a conveyor system).

Moreover, measuring system 204 can receive a hide in a variety of other ways. For example, measuring system 204 can receive a hide by detecting the loading of the hide into a measuring device of measuring system 204. As another example, measuring system 204 can include a conveyor system, and thus, receiving a hide can include detecting that a hide has been loaded onto the conveyor system. As a further example, measuring system 204 can include a wringing machine. Accordingly, receiving a hide at measuring system 204 can include detecting the loading of the hide into the wringing machine. Additionally or alternatively, receiving a hide at measuring system 204 can also include receiving user input from a human operator that indicates the loading of a hide into measuring system 204.

As shown by FIG. 3A, step 304 includes determining a characteristic of the hide. For example, one or more measuring devices of measuring system 204 determine one or more characteristics of the hide. As another example, measuring system 204 determines one or more characteristics of the hide by receiving user input that specifies the one or more characteristics (e.g., via user input into a user interface of a computing device coupled to measuring system 204). Thus, by determining a characteristic of the hide, measuring system 204 can improve the quality and consistency of hides by obtaining more information about the hides processed and sorted by a hide sorting system, such as hide sorting system 106.

As FIG. 3A illustrates, step 306 includes providing the characteristic of the hide to tanning control system 202. In particular, in one or more embodiments measuring system 204 provides a hide characteristic communication to tanning control system 202 (e.g., via a communication network). For example, measuring system 204 can provide a hide characteristic communication that includes a single hide characteristic as measured or determined by a device of measuring system 204. Alternatively, measuring system 204 can provide a hide characteristic communication that includes multiple hide characteristics as measured or determined by one or more devices of measuring system 204. As a result, measuring system 204 can assist tanning control system 202 in sorting the hide by providing detailed information concerning the characteristics and/or state of the hide.

As further shown by FIG. 3A, step 308 includes determining a hide identifier for the hide. In particular, tanning control system 202 generates a unique hide identifier for the hide. For example, tanning control system 202 can generate a unique hide identifier using a random number generator. As another example, tanning control system 202 can generate a unique hide identifier using a timestamp and/or date stamp. As yet another example, tanning control system 202 can generate a unique hide identifier as a sequential number for each hide (e.g., 1, 2, 3, etc.).

Further, tanning control system 202 can generate the unique hide identifier according to a hide identifier format. For example, the hide identifier format can include one or more alphanumeric characters which indicate the identifier relates to an individual hide (e.g., the letter "H" for hide), followed by two numerical characters specifying the month of processing the hide (e.g., "05" for May), followed by two numerical characters specifying the date of processing the hide (e.g., "15" for the 15$^{th}$ day of May), and a sequential hide number. Moreover, determining a hide identifier for the hide may also include concatenating or adding a batch identifier associated with the hide to a unique hide identifier generated by tanning control system 202.

As FIG. 3A illustrates, step 310 includes associating the characteristic of the hide with the hide identifier. More specifically, tanning control system 202 associates the characteristic of the hide with the hide identifier by storing the characteristic of the hide and the hide identifier in a tanning system database. Furthermore, tanning control system 202 can associate the characteristic of the hide with the hide identifier by linking the characteristic of the hide to the hide identifier in the tanning system database (e.g., creating a database relationship between a hide characteristic table and a unique hide identifier table). Associating such information in a tanning system database facilitates greater traceability of hides throughout the tanning processes and further assists in troubleshooting tanning processes.

As FIG. 3A shows, in one or more embodiments, step 312 includes determining a batch identifier of the hide. For example, measuring system 204 can determine a batch identifier of the hide by receiving user input from a human operator that specifies the batch identifier of the hide. As another example, measuring system 204 can determine a batch identifier of the hide by receiving an indication of the batch identifier from the tanning drum that processed the hide. Furthermore, in one or more embodiments tanning control system 202 generates and associates batch identifiers with hides during the unloading and tanning processes of tanning system 104.

Moreover, as FIG. 3A illustrates, step 314 includes providing the batch identifier of the hide to tanning control system 202. More specifically, in one or more embodiments measuring system 204 provides a batch identifier communication that indicates the batch identifier to tanning control system 202 (e.g., via a communication network). Furthermore, in one or more embodiments, measuring system 204 can combine the batch identifier communication and the hide characteristic communication discussed above into a single communication to tanning control system 202 (e.g., combining steps 306 and 314 into a single step). Thus, providing a batch identifier to tanning control system 202 enables tanning control system 202 to sort the hide based, at least in part, on the batch identifier of the hide and/or one or more characteristics associated with the batch identifier of the hide (e.g., batch hide type, plant identifier, etc.).

Alternatively, tanning control system 202 can determine the batch identifier of the hide without having measuring system 204 provide the batch identifier. More specifically, in one or more embodiments tanning control system 202 can track the batch identifiers of all batches processed by tanning system 104 and then determine a batch identifier of a batch that was most recently unloaded from a tanning drum but has not yet been processed by measuring system 204 (e.g., determining a batch identifier of a hide in a first-in-first-out ("FIFO") manner). For example, tanning control system 202 can utilize a tanning system database to identify a batch identifier of a tanning drum that was unloaded most recently and has not yet been processed by measuring system 204.

As FIG. 3A shows, step 316 includes associating the characteristics of the batch identifier with the hide identifier. In particular, tanning control system 202 associates the characteristics of the batch identifier with the hide identifier by storing the characteristics of the batch identifier and the hide identifier in a tanning system database. Furthermore, tanning control system 202 can associate the characteristics of the batch identifier with the hide identifier by linking the characteristics of the batch identifier to the hide identifier in the tanning system database (e.g., creating a database relationship between a batch characteristics table and a unique hide identifier table). Associating the characteristics of the batch identifier with the hide identifier enhances traceability by linking the hide sorting processes of hide sorting system 106 back to the tanning processes of tanning system 104.

As further illustrated by FIG. 3A, step 318 includes optionally providing the hide identifier to measuring system 204. For example, tanning control system 202 can provide a marking communication to a marking device of measuring system 204, wherein the marking communication indicates the hide identifier. Furthermore, in one or more embodiments, the marking communication can include other information that a marking device may use to mark the hide. As an example, the marking communication can include one or more of the batch identifier associated with the hide, the batch hide type associated with the hide, the hide identifier of the hide, as well as one or more other characteristics associated with the batch identifier and/or the hide identifier.

Additionally or alternatively, the marking communication can include an indication of a marking type (e.g., emboss, engrave, print, stamp, label, etc.) that indicates the type of mark that a marking device of measuring system 204 is to apply to the hide.

As FIG. 3A shows, step 320 includes optionally marking the hide with the hide identifier. In particular, measuring system 204 can mark the hide according to the capabilities of one or more marking devices. For example, measuring system 204 can include an embossing machine that embosses the hide with the hide identifier. As another example, measuring system 204 can include an engraving machine that engraves the hide identifier into the hide. As a further example, measuring system 204 can include a printer (e.g., laser, ink, etc.) that prints the hide identifier on the hide. In one or more embodiments, measuring system 204 can include a stamping machine that stamps the hide with the hide identifier. Additionally or alternatively, measuring system 204 can include a labeling machine that applies a label of the hide identifier to the hide. Accordingly, marking the hide provides improved traceability of hides.

As FIG. 3A further illustrates, step 322 includes providing a routing communication to routing manager 206. More specifically, the routing communication indicates how to move the hide from the measuring system 204 to the classifying system 210 via routing system 208. For example, some hide sorting systems can include multiple measuring systems and/or devices, as well as multiple routing systems and/or multiple classifying systems. Thus, the routing communication can include an identification of the particular measuring system that has the hide, an identification of the particular classifying system that is to receive the hide, and an identification of the routing system to use to transport the hide from the particular measuring system to the particular classifying system.

Consequently, in one or more embodiments, routing manager 206 can use such a routing communication to communicate with the appropriate routing system to move the hide as needed. As another example, other hide sorting systems may include only a single measuring system and a single classifying system connected via a single routing system (e.g., as shown by FIG. 2). In such a case, the routing communication can include a control signal or trigger that causes the routing system to move a hide from the measuring system to the classifying system, without the need for any additional routing information. Regardless, as FIG. 3B illustrates, after receiving the routing communication, step 324 includes moving the hide according to the routing communication.

As FIG. 3B also shows, step 326 includes determining a grade of the hide. For example and as previously discussed, classifying system 210 can determine a grade of the hide by receiving user input from a human operator, wherein the user input specifies the grade. As another example and as discussed above, classifying system 210 can determine a grade of the hide using a computer vision device that captures and analyzes an image of the hide. More specifically, in one or more embodiments the computer vision device can determine a grade of the hide by counting a number of butt brands and/or scratches on the hide (i.e. the fewer butt brands and/or scratches, the higher the quality grade). Moreover, the computer vision device can determine a grade of the hide by determining the location of any butt brands and/or scratches (i.e. higher grades for hides with butt brands and/or scratches on the margins of the hide, lower grades for hides with butt brands and/or scratches on the interior of the hide).

Further, as FIG. 3B illustrates, step 328 includes providing the grade of the hide to tanning control system 202. In particular, in one or more embodiments classifying system 210 provides a hide grade communication to tanning control system 202 (e.g., via a communication network). For example, classifying system 210 can provide a hide grade communication that includes a single hide grade as determined by classifying system 210. Alternatively, classifying system 210 can provide a hide grade communication that includes multiple hide grades as determined by classifying system 204 (e.g., a quality grade, a size grade, a butt brand grade, and a scratch grade, etc.). As a result, classifying system 210 can assist tanning control system 202 in sorting the hide based, at least in part, on one or more grades of hide.

As further shown by FIG. 3B, step 330 includes associating the grade of the hide with the hide identifier. More specifically, tanning control system 202 associates the grade of the hide with the hide identifier by storing the grade of the hide and the hide identifier in a tanning system database. Moreover, tanning control system 202 can associate the grade of the hide with the hide identifier by linking the grade of the hide to the hide identifier in the tanning system database (e.g., creating a database relationship between a hide grade table and a unique hide identifier table). Associating the grade of the hide with the hide identifier facilitates greater traceability and enables the tanning control system 202 to sort and package the hide based, at least in part, on the grade.

As FIG. 3B illustrates, step 332 includes sorting the hide. In particular, tanning control system 202 can sort the hide in a variety of ways. For example, tanning control system 202 can sort the hide by identifying a stacking site of stacking system 214. In one or more embodiments, identifying a stacking site of stacking system 214 can include determining a stacking site status for each stacking site of stacking system 214. Moreover, identifying a stacking site of stacking system 214 can include determining whether a stack at each of the one or more stacking sites is compatible with the hide. More specifically, determining whether a stack is compatible with the hide can include determining whether the relevant characteristics of the hides on the stack are the same or sufficiently similar to the relevant characteristics of the hide, such that the hide can be sorted to the stack.

For example, determining whether a stack is compatible with the hide can include determining that the classification of the hide is the same as the classification of the hides already on the stack. As another example, determining whether a stack is compatible can include determining that the hide type of the hide (e.g., as determined based on the batch hide type associated with the batch identifier of the hide) is the same as the hide type of the hides already on the stack. As a further example, determining whether a stack is compatible can include determining that prior tanning process characteristics (e.g., tannery process information, such as batch identifier, tanning recipe, chroming drum, plant identifier, etc.) associated with the hide are the same as prior tanning process characteristics associated with the hides already on the stack. Thus, tanning control system 202 can sort the hide according to a variety of criteria and hide characteristics, including but not limited to, classification (e.g., grade), weight, surface area, hide type, and batch identifier.

Moreover, tanning control system 202 can sort the hide by determining a pallet that is compatible with one or more characteristics of the hide. More specifically, determining a pallet that is compatible can include determining whether the relevant characteristics of the hides on the pallet are the same or sufficiently similar to the relevant characteristics of the hide, such that the hide can be sorted to the pallet. Thus, determining a pallet that is compatible can include analyzing the characteristics of the hides sorted to each active pallet at each stacking site of stacking system 214. Moreover, determining a pallet that is compatible can include comparing and/or matching one or more characteristics of the hide with one or more characteristics of hides already on the pallet. Furthermore, identifying a pallet can also include determining a pallet status (e.g., similar to a stacking site status). In addition, determining a pallet that is compatible can include identifying a stacking site associated with the pallet.

Furthermore, while tanning control system 202 can sort the hide, in some situations two or more stacking sites (or pallets) may be compatible with the hide. For example, in such situations, tanning control system 202 can sort the hide by determining that two or more stacking sites (or pallets) are compatible and, in response to such a determination, routing the hide to the compatible stacking site (or pallet) that is closest to full. As another example, tanning control system 202 can sort the hide by determining that two or more stacking sites (or pallets) are compatible and, in response to such a determination, routing the hide to the compatible stacking site (or pallet) that is closest to empty. Further, in one or more other embodiments, tanning control system 202 can sort the hide according to other rationales when one or more stacking sites (or pallets) are compatible with the hide (e.g., customer priority level, order urgency, etc.).

Moreover, in one or more embodiments, tanning control system 202 can sort the hide according to one or more customer specifications. More specifically, a customer specification can include one or more indications of characteristics of hides desired by a particular customer. For example, a customer specification can be generated from a customer order that specifies a desired hide classification (e.g., grade), hide type, weight, and/or surface area. Furthermore, tanning control system 202 can sort the hide according to one or more customer specifications by identifying a customer specification associated with one or more active stacking sites (or pallets) and comparing the characteristics of the hide to the desired characteristics specified by the customer specification associated with each of the one or more active stacking sites (or pallets). Thus, a customer specification can include a data file stored by tanning control system 202 in a data file format, such as Extensible Markup Language ("XML") or JavaScript Object Notation ("JSON"). Furthermore, as previously mentioned, a customer specification can include a sorting specification, a folding specification, a stacking specification, and a packing specification.

Thus, in one or more embodiments, sorting the hide according to step 332 can include determining a folding specification for the hide (i.e. an indication of how a folding device at a stacking site of stacking system 214 is to fold the hide). More specifically, determining a folding specification for the hide can include identifying a folding specification that is compatible with one or more relevant characteristics of the hide. For example, tanning control system 202 can determine a first hide type folding specification for a first hide having a first hide type (e.g., jumbo) and also determine a second hide type folding specification for a second hide having a second hide type (e.g., heifer). Moreover, tanning control system 202 can determine a folding specification for a hide based on any of the characteristics associated with the hide. Alternatively, tanning control system 202 can determine a folding specification based on a customer specification associated with the stack where the hide is to be sorted.

Once tanning control system 202 has determined which stacking site (or pallet) to stack the hide onto, tanning control system 202 can improve traceability by determining and storing a unique stacking site identifier (and/or pallet identifier) in association with the hide identifier of the hide. Alternatively, stacking system 214 (e.g., the particular stacking site for the hide) can confirm that the hide has been stacked on a particular stacking site, and then tanning control system 202 can associate the hide identifier with the stacking site identifier (and/or pallet identifier) in response to such a confirmation. Thus, tanning control system 202 can link such hide sorting information in a tanning system database, thereby increasing the traceability of the hide sorting system As illustrated by FIG. 3B, step 334 includes providing a routing communication to routing manager 206. More specifically, the routing communication specifies how to move the hide from classifying system 210 to a particular stacking site of stacking system 214 via routing system 212. For example, the routing communication can include an indication of a classifying system identifier and an indication of a stacking site identifier. As another example, the routing communication can include an indication of a classifying device identifier (e.g., computer vision device identifier) and an indication of a stacking site identifier. Additionally, one or more embodiments may include multiple routing systems between classifying systems and stacking sites, accordingly, the routing communication can also include an indication of the particular routing system to use to transport the hide to the particular stacking site (e.g., a routing system identifier, such as for a conveyor system).

As shown by FIG. 3B, step 336 includes moving the hide according to the routing communication. More specifically, routing manager 206 sends one or more control signals to routing system 212, which directs routing system 212 to transport the hide from classifying system 210 to a particular stacking site of stacking system 214. Moreover, routing manager 206 can direct routing system 212 to move the hide to a folding table proximate a particular stacking site of stacking system 214. Further, routing manager 206 can direct routing system 212 to move the folding table with the hide onto a folding device located at a particular stacking site. Thus, once routing manager 206 has moved the hide to the particular stacking site, the stacking site can fold and stack the hide onto a pallet.

Turning to FIG. 4, exemplary portions 400 of a tanning system database are illustrated in accordance with one or more embodiments. In one or more embodiments, tanning system database includes one or more databases (e.g., relational databases, non-relational databases, XML databases, JSON databases, SQL databases, NoSQL databases, cloud databases, etc.). Further, as illustrated by FIG. 4, a tanning system database can capture, associate, and store information related to individual hides processed by a hide sorting system, such as hide sorting system 106 of FIG. 2.

In particular, each column 402-414 shows the types of information that tanning control system 202 can capture, associate, and store with respect to individual hides shown by each row 416-428. For example, tanning control system 202 can determine a batch identifier 402 for each hide. Further, tanning control system 202 can determine a hide type 404 for each hide based on the batch identifier of the hide by identifying the batch hide type associated with the batch identifier (e.g., as shown in FIG. 5). Additionally, tanning control system 202 can generate, store, and associate a unique hide identifier 406 for each hide processed by hide sorting system 106. Moreover, tanning control system 202 can store and associate one or more hide characteristics with each hide (e.g., hide characteristic 408 and hide classification 410). The one or more hide characteristics can be received from one or more measuring systems and/or classifying systems (e.g., measuring system 204 and/or classifying system 210). Additionally or alternatively, the one or more hide characteristics can be determined and obtained from prior tannery process information (e.g., information recorded and stored in a tanning system database during unloading and tanning processes, such as that shown by FIG. 5).

Moreover, as FIG. 4 illustrates, once tanning control system 202 sorts a particular hide to a particular stacking site and pallet, tanning control system 202 can capture, store, and associate a unique hide identifier with a unique stacking site identifier 412 and/or a unique pallet identifier 414. Accordingly, as shown by FIG. 4, a tanning system database facilitates improved traceability by storing information related to the sorting of each hide.

Along similar lines, FIG. 5 illustrates additional exemplary portions 500 of a tanning system database in accordance with one or more embodiments. In particular, FIG. 5 illustrates exemplary portions 500 of a tanning system database that relate to information concerning prior tannery processes, such as the unloading and tanning processes performed by tanning system 104 of FIGS. 1-2. More specifically, each column 502-518 shows the particular types of information that tanning control system 202 can capture, associate, and store with respect to batches of hides shown by each row 520-526. Accordingly, tanning control system 202 can determine a batch identifier associated with a hide and then sort that hide based, at least in part, on the types of information shown in FIG. 5. In doing so, one or more embodiments improve traceability by linking information generated during the hide sorting process with information generated during prior tannery processes. Moreover, one or more embodiments can improve hide sorting efficiency by leveraging information generated during prior tannery processes.

Figure 6:
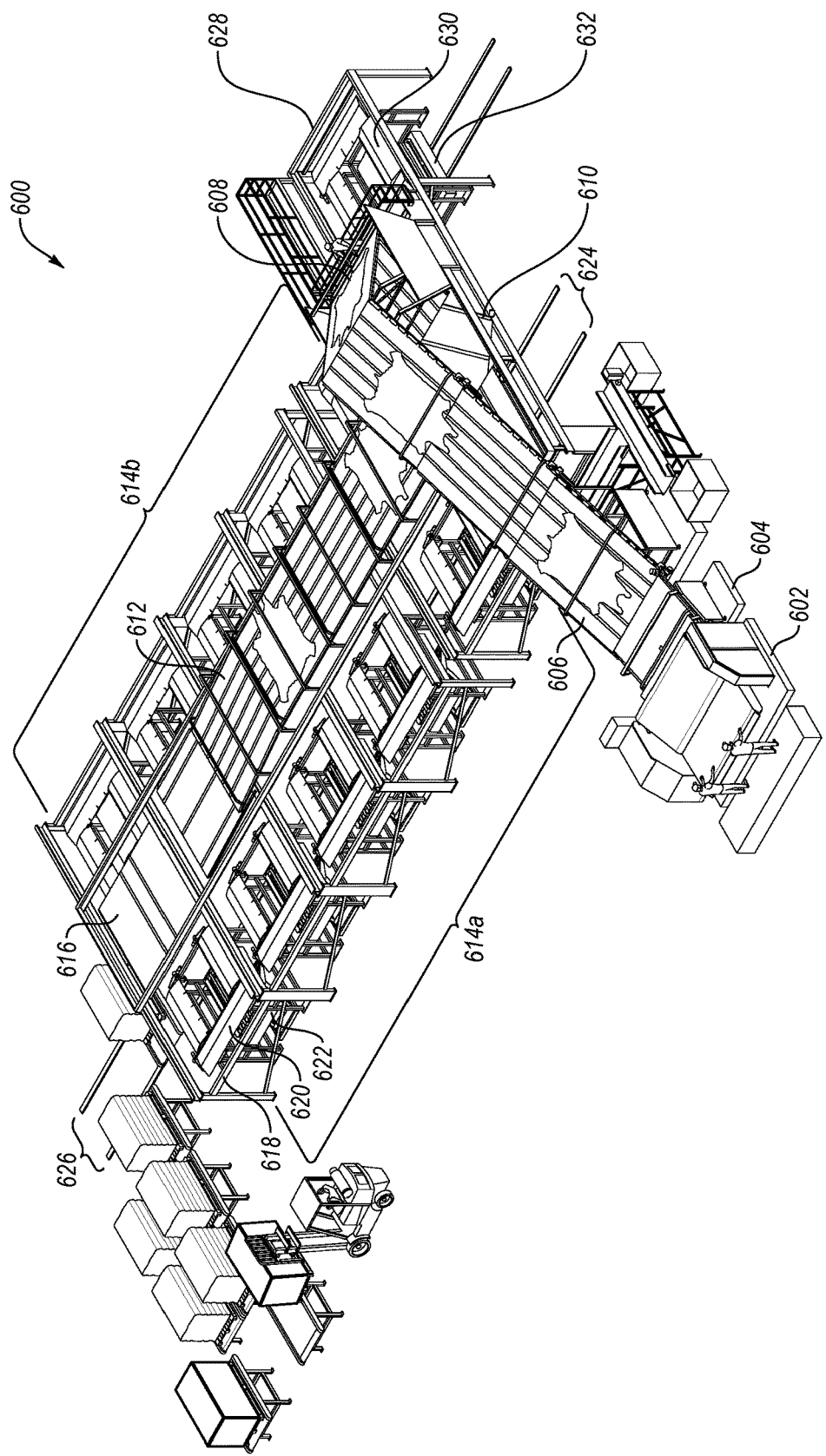
FIG. 6 illustrates a perspective view of a hide sorting system in accordance with one or more embodiments.

FIG. 6 illustrates a perspective view of a hide sorting system 600 in accordance with one or more embodiments. More specifically, FIG. 6 shows one embodiment of a hide sorting system 600, such as hide sorting system 106 of FIG. 2. As FIG. 6 shows, human operators can provide leather hides to a wringing machine 602. After passing through the wringing machine 602, a measuring system 604 determines one or more characteristics of each hide. For example, measuring system 604 can include a weight scale that determines a weight of each hide and communicates that weight to a tanning control system. Alternatively, measuring system 604 can include any other measuring devices, as previously described.

Following processing by measuring system 604, leather hides move along routing system 606 (i.e. a belt conveyor) to classifying system 608. As FIG. 6 shows, classifying system 608 can include a conveyor elevated at an angle that enables a human operator to determine a classification (e.g., grade) for the hide. However, as previously discussed, in other embodiments classification system 608 can classify hides without the need for a human operator (e.g., by using a computer vision device).

Once a leather hide is classified by classifying system 608, the hide moves onto a rotating conveyor system 610 (i.e. a rotating belt conveyor). If the hide was classified as defective, rotating conveyor system 610 can move the hide to reject stacking site 628, which can include a folding device 630 and one or more reject pallets 632. Alternatively, if the hide was not classified as defective, rotating conveyor system 610 can move the hide to routing system 612 (i.e. a belt conveyor) to be stacked at a particular stacking site selected from the plurality of stacking sites 614a-614b.

As shown by FIG. 6, each stacking site, such as stacking site 618, in the plurality of stacking sites 614a-614b can include a folding device 620, and one or more pallets 622. Furthermore, prior to a hide being folded and stacked onto a particular stacking site, routing system 612 can move the hide onto a folding table 616, which can then move over the folding device of a particular stacking site. As previously mentioned, a folding table 616 can prevent a hide from falling through a folding device, and facilitates consistent and precise folding of each hide.

Additionally, as FIG. 6 illustrates, hide sorting system 600 can include a rail system 624-626 which runs adjacent to the plurality of stacking sites 614a-614b and beneath routing system 612. Accordingly, when a pallet of hides is full, the pallet can automatically move onto rail system 624-626 and then move down the rail system 624-626 to a common unloading point, such as the locations indicated by 624 or 626. Moreover, when a full pallet is moved from a stacking site, it is replaced by an empty pallet at the stacking site. For example, stacks of empty pallets can be arranged at each stacking site, such that only the top pallet is loaded with hides, and an empty pallet is used when a full pallet is removed.

FIGS. 1-6, the corresponding text, and the examples provide a number of different systems and devices for sorting hides. In addition to the foregoing, embodiments can also be described in terms of flowcharts comprising acts and steps in a method for accomplishing a particular result. For example, FIG. 7, as described in further detail below, illustrates a flowchart of an exemplary method in accordance with one or more embodiments.

Figure 7:
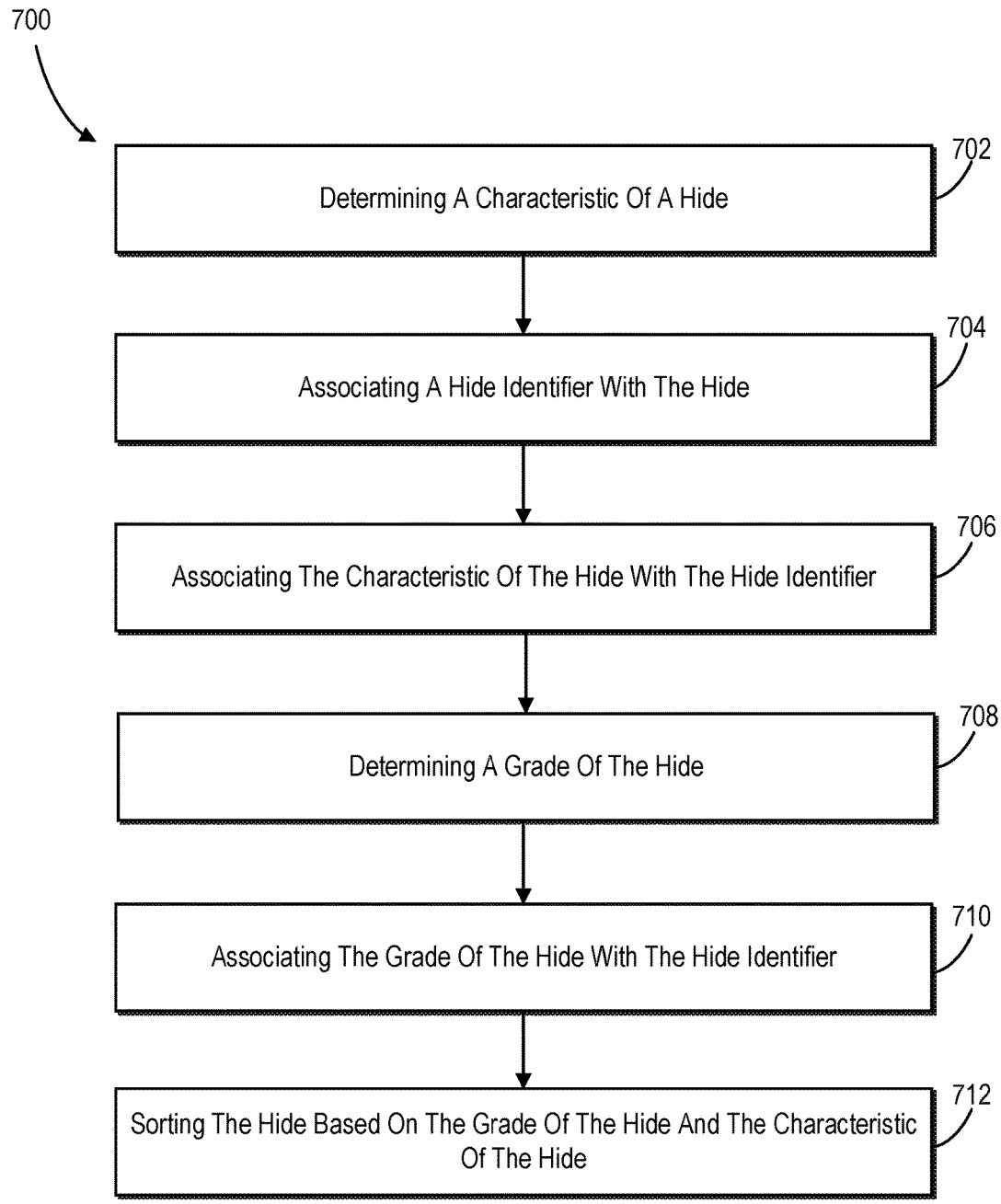
FIG. 7 illustrates a flowchart of a series of acts in a method of sorting hides in accordance with one or more embodiments.

FIG. 7 illustrates a flowchart of one exemplary method 700 of sorting hides from the perspective of a hide sorting system 106 and/or a tanning control system 202. The method 700 can include an act 702 of determining a characteristic of a hide. More specifically, act 702 can include determining a characteristic of a hide based on a batch identifier associated with a plurality of hides (i.e. a batch) that includes the hide. Further, act 702 can include determining a characteristic of a hide by determining a characteristic of a plurality of hides associated with the batch identifier (e.g., determining one or more batch characteristics). Additionally or alternatively, act 702 can include receiving a characteristic of a hide from a measuring system.

Moreover, method 700 can also include an act of identifying a batch identifier associated with a plurality of hides that includes the hide to be sorted. In particular, method 700 can include receiving, as user input, an identifier that identifies the plurality of hides and comparing the identifier to one or more batch identifiers stored in a tanning system database. Furthermore, method 700 can include determining, based on the comparison of the identifier to one or more batch identifiers, that the identifier does not match any batch identifiers and providing a notification to a user. Consequently, in one or more embodiments, method 700 can include providing a prompt to a user to re-enter the identifier in order to find a match with one or more batch identifiers stored in a tanning system database. Additionally, method 700 can include receiving user input at a measuring system (e.g., measuring system 204).

Furthermore, method 700 can also include an act of identifying a batch identifier by accessing a tanning system database. More specifically, method 700 can include identifying a batch identifier associated with a plurality of hides by selecting the batch identifier of the plurality of hides most recently unloaded from a chroming drum, as indicated by a tanning system database.

The method 700 may also include an act 704 of associating a hide identifier with the hide. In particular, act 704 can include generating a unique hide identifier for the hide. Furthermore, act 704 can include capturing the hide identifier in a tanning system database. Moreover, act 704 can include marking the hide with an indication of the hide identifier (e.g., by using a marking device). Additionally, act 704 can include associating a batch identifier with the hide identifier of the hide (e.g., linking the batch identifier and the hide identifier in a tanning system database, thereby creating a database relationship).

The method 700 may further include an act 706 of associating the characteristic of the hide with the hide identifier. More specifically, act 706 can include associating a characteristic of a plurality of hides (i.e. a batch) with the hide identifier by linking the characteristic to the hide identifier in a tanning system database. Additionally or alternatively, act 706 can include associating a characteristic of a hide with a hide identifier by linking a characteristic received from a measuring system with the hide identifier in a tanning system database.

FIG. 7 further illustrates that the method 700 can include an act 708 of determining a grade of the hide. In particular, act 708 can include determining a grade of the hide based on a grade received from a classifying device (e.g., as provided by a human operator (i.e. grader) or a computer vision device). Alternatively, act 708 can include determining a grade of the hide based on one or more characteristics associated with the batch identifier of the batch that includes the hide. Otherwise, act 708 can include determining a grade of the hide based on one or more characteristics received from a measuring device.

FIG. 7 also shows that the method 700 can include an act 710 of associating the grade of the hide with the hide identifier. More specifically, act 710 can include linking, in a tanning system database, the grade of the hide with the hide identifier (e.g., creating a database relationship between the grade of the hide and the hide identifier). Further, act 710 can include associating the grade of the hide with a batch identifier of the hide.

Method 700 can also include an act 712 of sorting the hide based on the grade of the hide and the characteristic of the hide. In particular, act 712 can include sorting the hide based on the grade of the hide and at least one characteristic selected from the one or more characteristics of the hide. Act 712 can also include determining whether one or more stacking sites are compatible with the hide. Thus, act 712 can include determining a stacking site status for each of one or more stacking sites. Further, act 712 can include sorting the hide based on one or more customer specifications.

Moreover, method 700 can include an act of stacking the hide. More specifically, method 700 can include an act of stacking the hide on a pallet, identifying a pallet identifier associated with the pallet, and associating the pallet identifier with the hide identifier. Furthermore, method 700 can include an act of generating a pallet identifier for the pallet and linking the pallet identifier with the hide identifier in a tanning system database. Additionally, method 700 can include an act of marking the pallet with the pallet identifier.

In one or more embodiments, method 700 can also include an act of identifying a customer specification and sorting the hide according to the identified customer specification. In particular, method 700 can include an act of identifying a customer specification based on the grade of the hide and at least one characteristic selected from the one or more characteristics of the hide. Further, method 700 can include an act of folding and/or stacking the hide according to the identified customer specification.

Embodiments may comprise or use a special purpose or general-purpose computer including computer hardware, such as, for example, one or more processors and system memory, as discussed in greater detail below. Embodiments within the scope also include physical and other computer-readable media for carrying or storing computer-executable instructions and/or data structures. In certain particular embodiments, one or more of the processes described herein may be implemented at least in part as instructions embodied in a non-transitory computer-readable medium and executable by one or more computing devices (e.g., any of the media content access devices described herein). In general, a processor (e.g., a microprocessor, etc.) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, one or more embodiments can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) use transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of one or more embodiments. The computer executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the one or more embodiments may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. One or more embodiments may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service (SaaS), Platform as a Service (PaaS), and Infrastructure as a Service (IaaS). A cloud computing model can also be deployed using different deployment models such as private cloud, community cloud, public cloud, hybrid cloud, and so forth. In this description and in the claims, a "cloud computing environment" is an environment in which cloud computing is employed.

Figure 8:
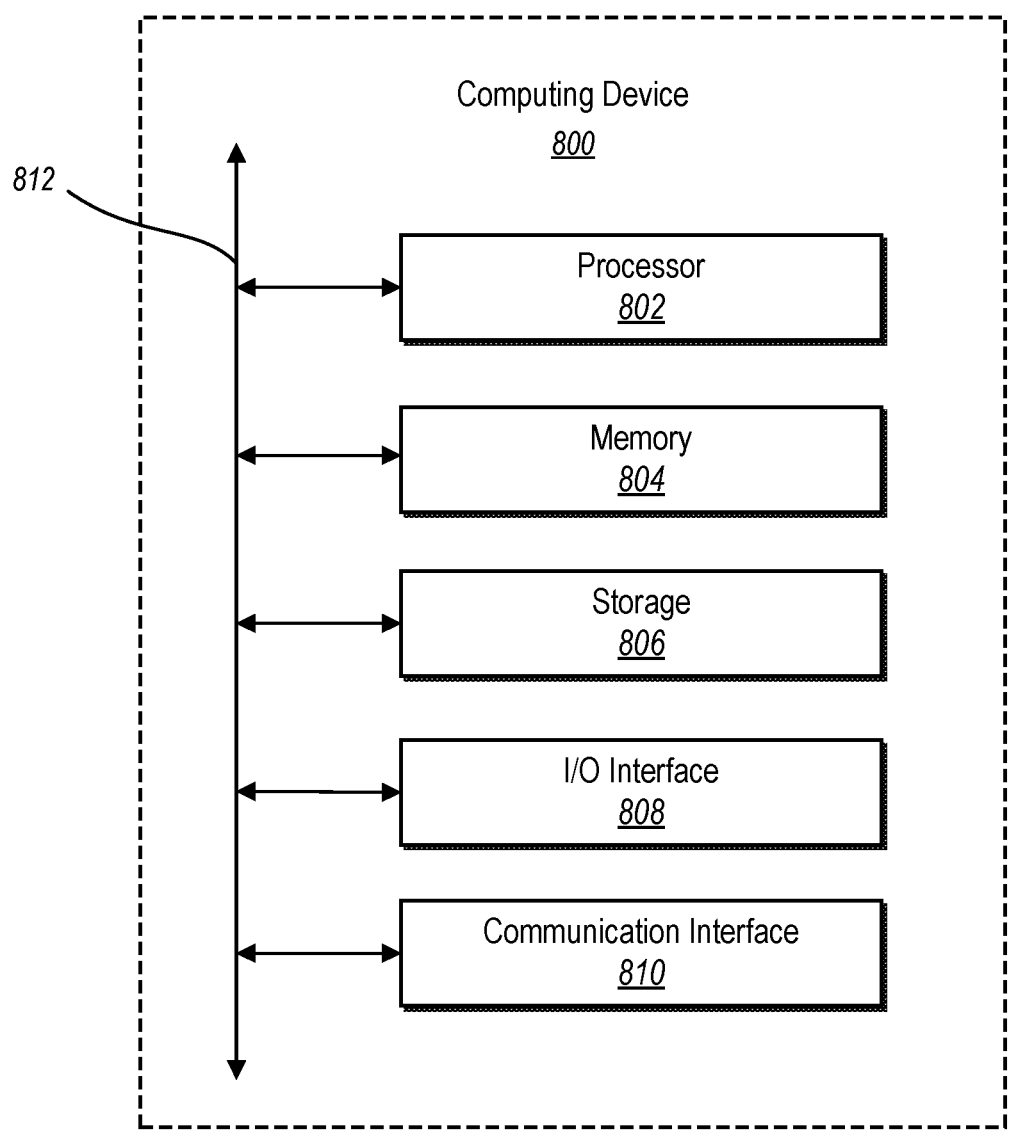
FIG. 8 illustrates a schematic block diagram of an exemplary computing device in accordance with one or more embodiments.

FIG. 8 illustrates, in block diagram form, an exemplary computing device 800 that may be configured to perform one or more of the processes described above. The systems and components 102-112 of FIG. 1 and 202-214 of FIG. 2 can each comprise implementations of the data-computing device 800. As shown by FIG. 8, the computing device can comprise a processor 802, memory 804, a storage device

806, an I/O interface 808, and a communication interface 810. While an exemplary computing device 800 is shown in FIG. 8, the components illustrated in FIG. 8 are not intended to be limiting. Additional or alternative components may be used in other embodiments. Furthermore, in certain embodiments, a computing device 800 can include fewer components than those shown in FIG. 8. Components of computing device 800 shown in FIG. 8 will now be described in additional detail.

In particular embodiments, processor(s) 802 includes hardware for executing instructions, such as those making up a computer program. As an example and not by way of limitation, to execute instructions, processor(s) 802 may retrieve (or fetch) the instructions from an internal register, an internal cache, memory 804, or a storage device 806 and decode and execute them. In particular embodiments, processor(s) 802 may include one or more internal caches for data, instructions, or addresses. As an example and not by way of limitation, processor(s) 802 may include one or more instruction caches, one or more data caches, and one or more translation lookaside buffers (TLBs). Instructions in the instruction caches may be copies of instructions in memory 804 or storage device 806.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory (RAM), Read Only Memory (ROM), a solid state disk (SSD), flash, Phase Change Memory (PCM), or other types of data storage. The memory 804 may be internal or distributed memory.

The computing device 800 includes a storage device 806 for storing data or instructions. As an example and not by way of limitation, storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. Storage device 806 may include removable or non-removable (or fixed) media, where appropriate. Storage device 806 may be internal or external to the computing device 800. In particular embodiments, storage device 806 is non-volatile, solid-state memory. In particular embodiments, storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory, or a combination of two or more of these.

The computing device 800 also includes one or more input or output (I/O) devices/interfaces 808, which are provided to allow a user to provide input to, receive output from, and otherwise transfer data to and from the computing device 800. These I/O devices/interfaces 808 may include a mouse, keypad or a keyboard, a touch screen, camera, optical scanner, network interface, modem, other known I/O devices or a combination of such I/O devices/interfaces 808. The touch screen may be activated with a stylus or a finger.

The I/O devices/interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 808 is configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 can provide one or more interfaces for communication (such as, for example, packet-based communication) between the computing device 800 and one or more other computing devices or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 810. As an example and not by way of limitation, computing device 800 may communicate with an ad hoc network, a personal area network (PAN), a local area network (LAN), a wide area network (WAN), a metropolitan area network (MAN), or one or more portions of the Internet, or a combination of two or more of these. One or more portions of one or more of these networks may be wired or wireless. As an example, computing device 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 800 may include any suitable communication interface 810 for any of these networks, where appropriate.

The computing device 800 can further include a bus 812. The bus 812 can comprise hardware, software, or both that couples components of computing device 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, various embodiments have been described with reference to specific exemplary embodiments thereof. Various embodiments and aspects are described with reference to details discussed herein, and the accompanying drawings illustrate the various embodiments. The description above and drawings are illustrative and are not to be construed as limiting. Numerous specific details are described to provide a thorough understanding of various embodiments.

One or more embodiments may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A method of hide sorting comprising:
   identifying a batch identifier associated with a plurality of hides;
   determining, by at least one processor and based on the batch identifier, a batch characteristic associated with the plurality of hides, the batch characteristic created during a prior tanning process applied to the plurality of hides;
   generating a hide identifier for a hide of the plurality of hides;
   associating the batch characteristic with the hide identifier; and
   sorting the hide based on the batch characteristic.

2. The method of claim 1, further comprising:
   receiving, as user input, an identifier that identifies the plurality of hides;
   comparing the identifier to batch identifiers stored in a tanning system database;
   determining, based on the comparison, the identifier does not match any of the batch identifiers stored in the tanning system database; and
   based on the determination that the identifier does not match any of the batch identifiers stored in the tanning system database, providing a notification to a user.

3. The method of claim 2, wherein the notification to the user comprises a prompt to re-enter the identifier.

4. The method of claim 3, further comprising receiving the user input at a measuring system.

5. The method of claim 1, further comprising accessing a tanning system database to identify the batch identifier associated with the plurality of hides.

6. The method of claim 5, wherein identifying the batch identifier associated with the plurality of hides comprises selecting the batch identifier based on the batch identifier being associated with a batch most recently unloaded from a chroming drum as indicated by the tanning system database, wherein the batch includes the plurality of hides.

7. The method of claim 1, wherein the batch characteristic comprises a hide type.

8. The method of claim 1, further comprising marking the hide with an indication of the hide identifier.

9. The method of claim 1, further comprising associating the batch identifier with the hide identifier.

10. The method of claim 1, further comprising:
    stacking the hide on a pallet;
    identifying a pallet identifier associated with the pallet; and
    associating the pallet identifier with the hide identifier.

11. The method of claim 1, further comprising:
    identifying a customer specification based on the batch characteristic; and
    folding the hide according to the customer specification.

12. A method of hide sorting comprising:
    determining, by at least one processor and based on a batch identifier associated with a plurality of hides, a batch characteristic associated with the plurality of hides, the batch characteristic created during a prior tanning process applied to the plurality of hides generating a hide identifier for a hide of the plurality of hides; associating the batch characteristic with the hide identifier;
    after determining the batch characteristic, move the hide of the plurality of hides from a first device to a second device;
    based on the batch characteristic, moving the hide from the second device to a stacking site selected from a plurality of stacking sites; and
    stacking the hide at the stacking site.

13. The method of claim 12, wherein the batch characteristic comprises a hide type.

14. The method of claim 12, wherein the first device comprises a measuring system and the second device comprises a classifying system.

15. The method of claim 12, further comprising:
    identifying a pallet identifier of a pallet located at the stacking site;
    stacking the hide onto the pallet;
    identifying a hide identifier associated with the hide; and
    associating the pallet identifier with the hide identifier.

16. The method of claim 15, further comprising:
    identifying a stacking site identifier associated with the stacking site; and
    associating the stacking site identifier with the pallet identifier.

17. The method of claim 15, further comprising moving the pallet to an unloading site common to the plurality of stacking sites.

18. The method of claim 15, further comprising marking the pallet with an indication of the pallet identifier.

19. A hide sorting system comprising:
    one or more computing devices; and
    a non-transitory storage medium comprising instructions that, when executed by the one or more computing devices, cause the system to:
      identify a batch identifier associated with a plurality of hides;
      determine, based on the batch identifier, a batch characteristic associated with the plurality of hides, the batch characteristic created during a prior tanning process applied to the plurality of hides;
      generate a hide identifier for a hide of the plurality of hides;
      associate the batch characteristic with the hide identifier; and
      sort the hide based on the batch characteristic.

20. The system as recited in claim 19, wherein the instructions, when executed by the one or more computing devices, further cause the system to:
    stack the hide on a pallet;
    identify a pallet identifier associated with the pallet; and
    associate the pallet identifier with the hide identifier.

* * * * *